No. 859,069.  
PATENTED JULY 2, 1907.  
E. KEMPSHALL.  
TIRE.  
APPLICATION FILED MAR. 22, 1906.
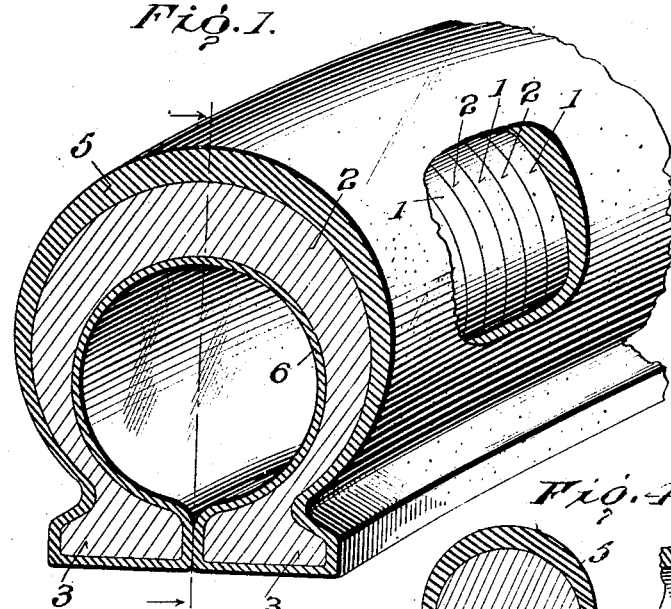
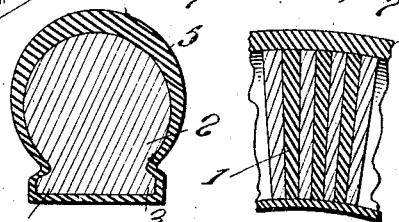
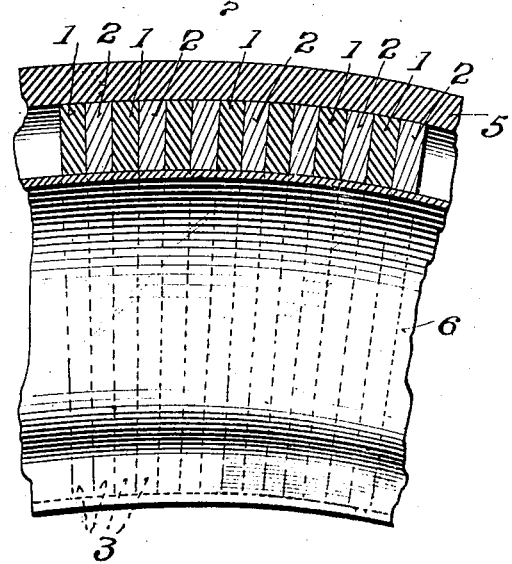
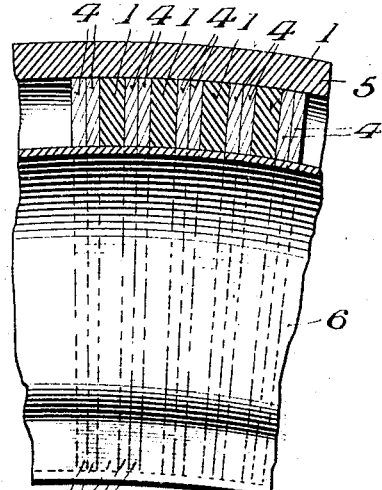
Witnesses  
W. A. Williams  
Alice H. Bennett
Inventor  
Eleazer Kempshall  
By Jn Imrie  
Attorney

UNITED STATES PATENT OFFICE.

ELEAZER KEMPSHALL, OF BOSTON, MASSACHUSETTS, ASSIGNOR TO KEMPSHALL TIRE COMPANY, OF BOSTON, MASSACHUSETTS, A CORPORATION OF MAINE.

TIRE.

No. 859,069.  Specification of Letters Patent.  Patented July 2, 1907.

Application filed March 22, 1906. Serial No. 307,430.

*To all whom it may concern:*

Be it known that I, ELEAZER KEMPSHALL, a citizen of the United States, residing at Boston, in the county of Suffolk and State of Massachusetts, have invented certain new and useful Improvements in Tires, of which the following is a specification.

This invention relates to an improvement in vehicle tires, and particularly to a tire of the cushion type which shall combine the maximum resiliency and durability while at the same time avoiding the objections incident to the usual pneumatic tire.

The tire of the present invention is made up of a plurality of transversely arranged sections constructed of materials of varying degrees of resiliency, the less resilient sections serving as a reinforce and brace for the more resilient sections.

The invention will be described in the following specification, reference being had particularly to the accompanying drawings, in which:—

Figure 1 is a broken perspective of a tire constructed in accordance with my invention, illustrating particularly the transverse sectional formation of the tire. Fig. 2 is a broken longitudinal section of the tire. Fig. 3 is a similar view showing a modified construction of tire. Fig. 4 is a view of a tire showing solid sections. Fig. 5 is a detail longitudinal section of the same.

Referring particularly to the drawings, my improved tire is constructed of a plurality of sections 1 and 2, arranged transversely of and alternately throughout the length of the tire. By preference, the sections 1, are composed of a relatively high resilient material, as rubber, while the sections 2, are composed of a material of less degree of resiliency, as leather, fibrous material or the like. Each section is formed with an opening, whereby to provide a channel extending longitudinally of the tire when said sections are assembled. The openings are eccentric to the outer contour of the sections, to provide a thickened surface adjacent the tread, and if preferred end projections 3, may be employed to engage beneath the securing flanges of the wheel felly. The channel is lined with a hollow resilient or like lining 6.

The sections 1 and 2, are to be arranged alternately throughout the length of the tire with their contacting surfaces cemented or otherwise secured together, to provide a solid body formed of transversely arranged sections alternately disposed, so that a relatively non-resilient section will be effective as a brace and reinforce for a resilient section.

In Fig. 3, I have illustrated a modified form in which the relatively non-resilient sections are in effect composed of duplicate strips 4, of the same material secured together, adding materially to the reinforcing effect.

The tire structure is inclosed in an envelop 5, preferably of rubber, or the usual tire covering, which envelop may be of any desired sectional formation, preferably however being constructed to give the greatest thickness at the tread portion of the tire. In the use of the envelop and lining 6, as a covering for the tire construction described, it is highly desirable that an effective binding be secured between the sections and envelop or covering. To secure this binding I prefer to vulcanize the tire structure and lining, thereby providing in effect an integral body, including the lining, and resilient sections of the tire proper, the relatively non-resilient sections, of course, being unaffected by the vulcanizing process.

A tire constructed as above described possesses a high degree of resiliency without depending upon any pneumatic principle, being therefore free of difficulties arising from punctures. It has the further advantage of being cheaply constructed, and owing to the use of the relatively non-resilient sections, is very durable.

While preferring to use rubber and leather as the material for the sections, it is of course, obvious, that these materials may be respectively replaced by others having similar characteristics, as the desired element in the construction is the use of a resilient section in connection with a section of relatively non-resilient material which will in effect brace and reinforce the resilient section when under load strain.

As shown in Figs. 4 and 5, the tire is composed of rubber sections 1, and leather sections 2, but omitting the openings therein, the cover 5, incasing the assembled sections.

Having thus described the invention what is claimed as new, is:—

1. A tire composed of transversely arranged sections of rubber and leather, and a covering for the sections, said covering being vulcanized to the rubber sections.

2. A tire comprising alternate sections of a resilient and relatively non-resilient material, a covering for said sections, and a lining for the sections, said covering and lining being vulcanized to the resilient sections.

3. A tire composed of transversely arranged alternately disposed sections of rubber and leather, each of said sections being formed with an opening, a covering for the sections, a lining fitting the opening in the sections, said covering and lining being vulcanized to the rubber sections.

4. A tire comprising alternately arranged sections of a resilient and relatively non-resilient material, an integral strip forming a covering and a lining for the sections, said strip being vulcanized to the resilient sections.

5. A tire constructed of alternately disposed sections of resilient and relatively non-resilient material, each of said sections being formed with a central opening and divided radially, and a strip vulcanized to the resilient sections and fitting the periphery of the sections and the wall of the interior openings, said strip passing through the radial division.

6. A tire composed of transversely arranged sections of rubber and material of less degree of resiliency than the rubber sections and formed with openings to provide a channel, a resilient element within the channel, a resilient cover for the sections, said cover and said resilient element being vulcanized to the rubber sections.

7. A tire composed of resilient and relatively non-resilient sections of material, said non-resilient sections being formed of a plurality of strips of material connected together and disposed in parallel relation to the resilient sections, and a covering for the sections vulcanized to the resilient sections.

8. A tire comprising alternately disposed sections of a resilient and relatively non-resilient material, the non-resilient section comprising a plurality of strips secured together, and a covering for the sections, said covering being vulcanized to the resilient sections.

9. A tire composed of transversely arranged sections of resilient material and interposed non-resilient material, the latter sections bending tangentially under load strain, the said sections formed with openings to provide a channel, a resilient lining for the channel, and a resilient cover for the sections, said cover being vulcanized to the resilient sections.

10. A tire having in its composition a series of rubber sections formed with openings, non-resilient sections formed with openings, said openings in the rubber and non-resilient sections forming a channel, a hollow resilient lining for the channel, and a resilient cover for the sections, said cover being vulcanized to the rubber sections to bind the tire together.

In testimony whereof I have signed my name to this specification in the presence of two subscribing witnesses.

ELEAZER KEMPSHALL.

Witnesses:
JNO. IMIRIE,
ELIZABETH L. MACFATE.